United States Patent [19]

Sheffer

[11] Patent Number: 4,998,072

[45] Date of Patent: Mar. 5, 1991

[54] HIGH RESOLUTION DIRECT DIGITAL SYNTHESIZER

[75] Inventor: Tzafrir Sheffer, Seattle, Wash.

[73] Assignee: John Fluke Mfg. Co., Inc., Everette, Wash.

[21] Appl. No.: 482,290

[22] Filed: Feb. 20, 1990

[51] Int. Cl.⁵ .......................... H03K 5/13; H03C 1/50
[52] U.S. Cl. ........................................ 328/14; 364/718
[58] Field of Search .................... 328/14, 27; 364/718;
332/31 R; 307/529, 261, 271

[56] References Cited

U.S. PATENT DOCUMENTS

| | | | |
|---|---|---|---|
| 4,331,941 | 5/1982 | Kovalick | 332/31 R |
| 4,901,027 | 2/1990 | Kitayoshi | 328/155 |
| 4,901,265 | 2/1990 | Kerr et al. | 364/721 |

Primary Examiner—Stanley D. Miller
Attorney, Agent, or Firm—John P. Dellett; George T. Noe

[57] ABSTRACT

The frequency resolution of a direct digital synthesizer is increased by varying the phase increment used to accumulate wave lookup table addresses between two integer values. The time periods during which the larger integer value is employed is proportional to a fractional part of the desired phase increment for providing an analog output at a selected frequency.

11 Claims, 4 Drawing Sheets

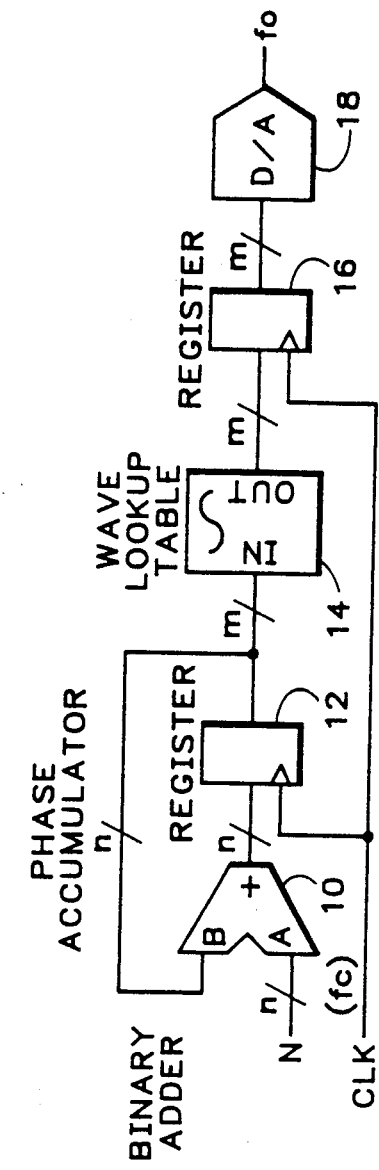
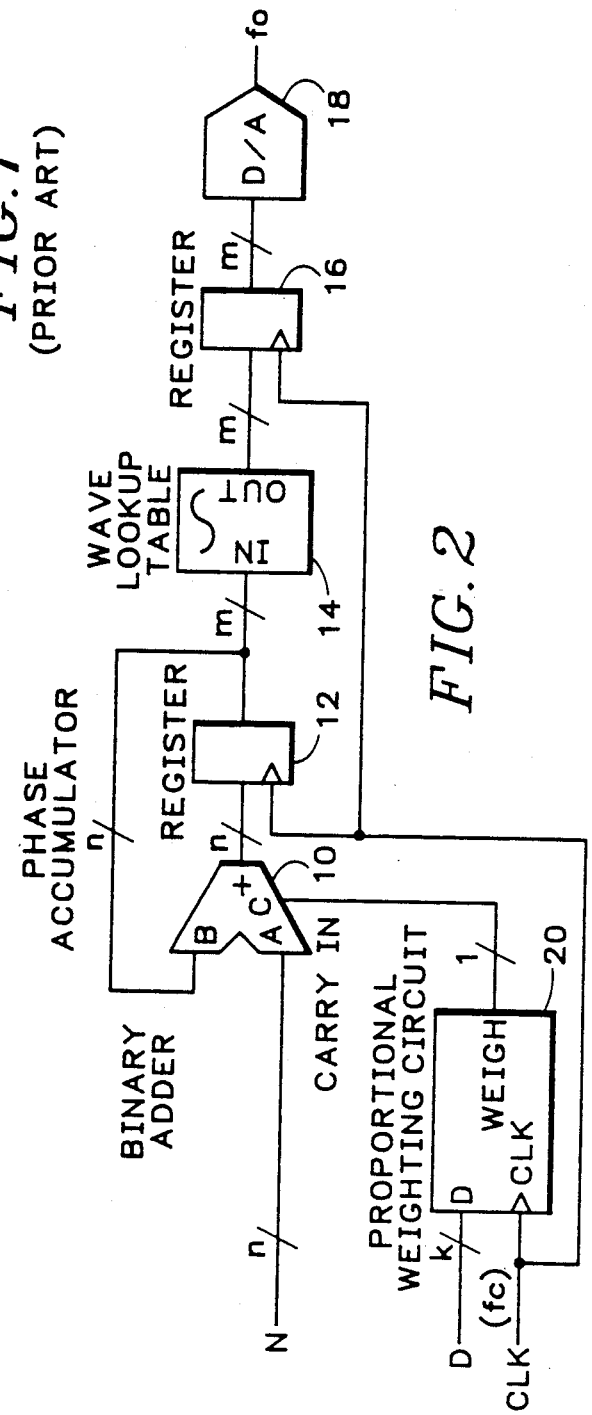
FIG. 1 (PRIOR ART)
FIG. 2 ically pointed out and distinctly claimed in the conclud-
HIGH RESOLUTION DIRECT DIGITAL SYNTHESIZER

BACKGROUND OF THE INVENTION

The present invention relates to a direct digital synthesizer which provides a large number of tuning channels without requiring a complex and slowly operating phase accumulator.

A direct digital synthesizer is an electronic apparatus for generating a cyclic waveform from instantaneous values thereof stored in a wave lookup table or memory. The wave lookup table is accessed by a phase number address that is successively increased by a phase increment. In a typical circuit, a phase accumulator employed to address the phase lookup table repeatedly adds the phase increment to its accumulation for generating successive addresses. The smaller the phase increment, the more samples are obtained from the wave lookup table during a given output period, and the lower the frequency of the output. If the phase increment is made larger, the output frequency increases. After a complete cycle of the waveform has been accessed from the wave lookup table, the process is repeated, with the digitally stored samples being supplied to a digital-to-analog converter for generating the desired waveform output.

Direct digital synthesizers are limited in maximum number of tuning channels by the size of the accumulator employed for addressing the wave lookup table. Increasing the size of the accumulator results in reduced channel spacing and an increase in the number of possible tuning channels (i.e., providing increased frequency resolution). However, circuit complexity is increased and the rate at which the circuit can operate is reduced. The last effect is due to the longer carry propagation chain associated with a larger adder circuit forming part of the accumulator.

An example of a prior art direct digital synthesizer is described in U.S. Pat. No. 3,735,269 to Jackson. In this apparatus, used to synthesize decimal based frequency steps, a binary coded decimal adder is used to accumulate the phase. Unfortunately, there is substantial delay associated with the BCD arithmetic.

Another example is set forth and claimed in co-pending application Ser. No. 07/325,359, filed Mar. 17, 1989, now U.S. Pat. No. 4,951,004, for "Coherent Direct Digital Synthesizer" filed by Tzafrir Sheffer and Eric Drucker. This application relates to a phase locked circuit based on a binary phase accumulator. Although this approach provides a coherent output, analog components are required such as a low pass filter and a voltage-controlled oscillator, rendering the circuit more complex and less integrable into a digital IC.

SUMMARY OF THE INVENTION

According to the present invention in a particular embodiment thereof, a wave lookup table is accessed by a phase accumulator providing addressing to the wave lookup table in response to an increment value which is successively added to the previous accumulation. The increment value alternately comprises a first whole number increment and a second whole number increment applied to the accumulator for first and second time periods respectively. The time period during which the first increment value is asserted and the time period during which the second increment value is asserted are proportioned so as to effect a desired fractional increase for the lower increment value. The phase accumulator is relatively uncomplex and therefore can operate at a high rate, while providing a large number of tuning channels usually associated with a more complicated accumulator. Due to resolution improvement, it is possible to synthesize highly accurate decimal based frequency steps employing a commonly used decimal based frequency reference source.

In a specific embodiment according to the present invention, a phase accumulator comprising an adder and a register is employed for addressing a wave lookup table. A proportional weighting circuit changes the phase increment value applied to the phase accumulator on a periodic basis by periodically adding one to the increment value. A duty cycle is determined during which the integer one is added to the increment value, as compared to the time when it is not so added, so as to effect a desired fractional addition to the increment value.

It is accordingly an object of the present invention to provide an improved direct digital synthesizer exhibiting an increased number of tuning channels as compared with prior synthesizers other than those requiring a complex and slow phase accumulator.

It is another object of the present invention to provide an improved high-resolution direct digital synthesizer which is fast in operation and non-complex in implementation.

It is another object of the present invention to provide an improved direct digital synthesizer employing a phase accumulator receiving an increment value as an input wherein a fractional part of the increment value is simulated by adding an integer to said increment value on a duty cycle basis.

It is a further object of the present invention to provide an improved high-resolution direct digital synthesizer which is simple in construction while providing a nearly coherent output.

It is another object of the present invention to provide an improved method for producing a cyclic output from wave lookup values stored in memory.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 1 is a block diagram of a direct digital synthesizer of the prior art,

FIG. 2 is a block diagram of a high-resolution direct digital synthesizer according to a first embodiment of the present invention, FIG. 3 is a block diagram of a high-resolution direct digital synthesizer according to a second embodiment of the present invention, FIG. 4 is a block diagram of a proportional weighting circuit as may be utilized in the FIG. 2 or FIG. 3 embodiment, and FIGS. 5 through 9 are waveform charts illustrating operation of the FIG. 4 weighting circuit.

DETAILED DESCRIPTION

Figures 3, 4:
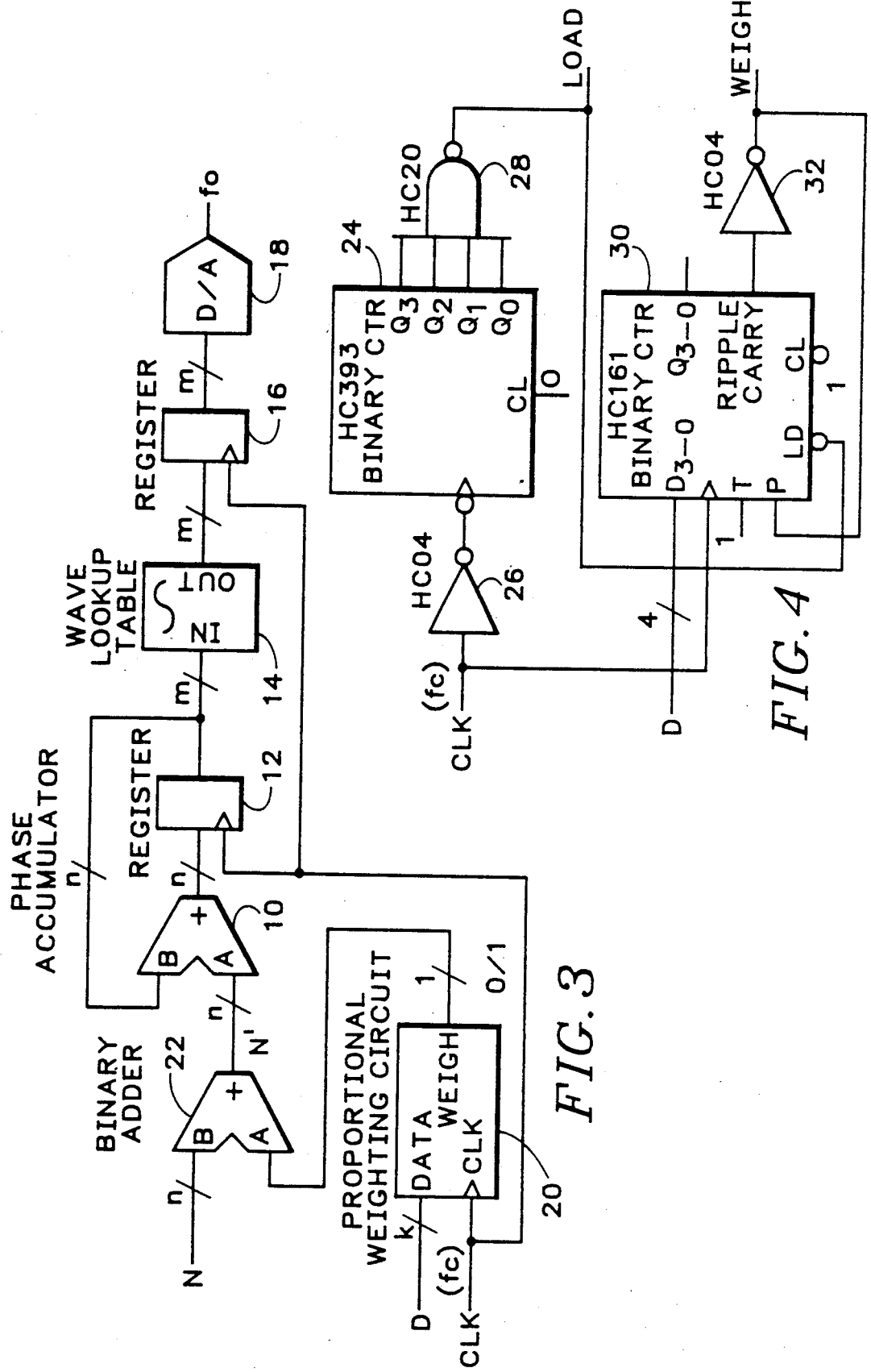

Referring to the drawings, and particularly to FIG. 1, the construction and operation of a prior art direct digital synthesizer will be reviewed. A phase accumulator comprises an adder 10 and a register 12 for receiving and storing the output of the adder upon the occurrence of the clock pulse ($f_c$). The output of the register is fed back to the input B of the adder, which also receives an integer phase increment number N on its A input. The integer phase increment, N, is selected by circuit means (not shown) for generating a cyclic output of predetermined frequency. At each occurrence of a clock pulse, $f_c$, the output of the adder is entered in the register, and N is added to the new register contents such that upon the next occurrence of the clock pulse, a new number, increased by N, is stored in register 12.

The phase number stored in register 12 is employed for addressing a lookup table 14, suitably comprising a conventional memory array which stores instantaneous amplitude values of a waveform it is desired to generate. Thus, the wave lookup table 14 may store successive amplitude values of a sine wave relative to closely spaced X axis values (along its phase axis), used for addressing the amplitudes. If the phase number from register 12 increases by large increments (where N is large), "skipping" many addresses in wave lookup table 14, an output will be provided from the wave lookup table representative of a comparatively high frequency. On the other hand, if the phase number in register 12 increases by small steps (where N is small) so as to provide nearly every successive address to the wave lookup table 14, then an output representative of a comparatively low frequency wave is provided.

The outputs from the wave lookup table, comprising successive digital numbers, are entered in output register 16 upon the occurrence of the clock pulse ($f_c$). The digital-to-analog converter 18 converts the digital amplitude values from register 16 to a filtered amplitude representation of frequency $f_o$.

The following equations illustrate the mathematical relationships of the FIG. 1 direct digital synthesizer circuit. The direct digital synthesizer output frequency is given by $$f_o = f_c(N/2^n) \quad (1)$$

where $f_o$ is the output frequency of the direct digital synthesizer, $f_c$ is the clock frequency, n is the size of the phase accumulator in binary bits, and N is the integer phase increment, ($0 \leq N < 2^n$). The direct digital synthesizer frequency resolution or channel spacing is given as follows:

$$f_r = f_c/2^n \text{ (Hz/count)} \quad (2)$$

The number of usable tuning channels, $n_f$, is the total number of discrete tunable frequencies below the Nyquist frequency of $f_c/2$, as follows:

$$n_f = 2^{n-1} - 1 \quad (3)$$

The commonly used tuning procedure for the FIG. 1 circuit involves the calculation of a desired accurate phase increment N' by means of some computing element, and asserting the closest integer value (truncation), N, as the input to adder 10 in FIG. 1. This approach results in an asymmetrical frequency setting error of up to $f_c/2^n$. To minimize the error due to the finite size of the phase accumulator, the calculated real phase increment value N' can instead be rounded off to the nearest integer N and applied to the phase accumulator. The process produces an error that is within $\pm f_c/2^{n+1}$. In any case, it is seen from expression (3) that the number of tunable frequencies is limited by the size of the accumulator.

According to the present invention, the number of frequency channels for the direct digital synthesizer is significantly increased without increasing the size of the accumulator and thereby incurring penalties of complexity and slow speed. Referring to FIG. 2, wherein corresponding elements are indicated by corresponding reference numerals, proportional weighting circuit 20 is added to supply an additional input to the phase accumulator. As in the prior art circuit of FIG. 1, an integer phase increment, N, is applied to adder 10 which repeatedly increments the total in register 12 by N. However, the value of N is in effect periodically changed so that for part of the time the total in register 12 is incremented by N+1 instead of N. This further addition of plus one is implemented without additional circuitry in the embodiment of FIG. 2 by utilizing adder 10 of the phase accumulator and providing an input to its carry-in terminal on a periodic basis. The additional "one" input is supplied from the WEIGH output of proportional weighting circuit 20.

Figure 7:
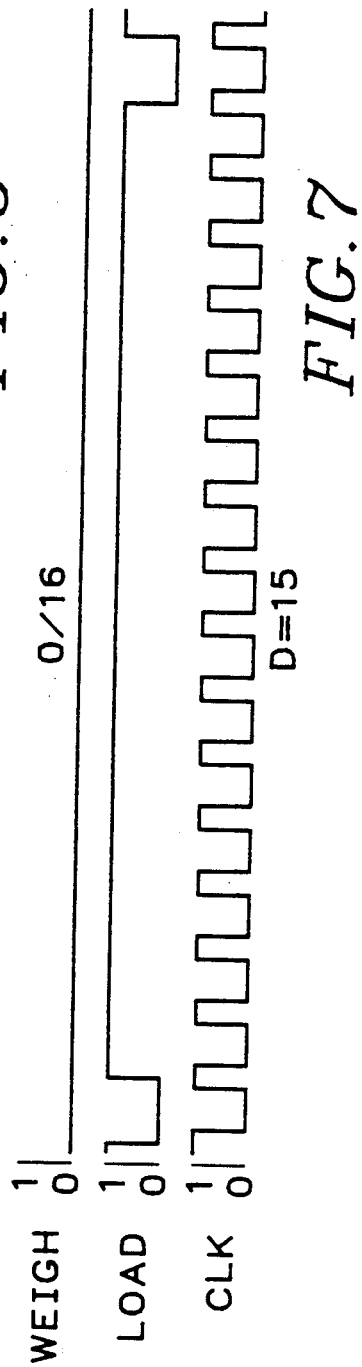
Figure 8:
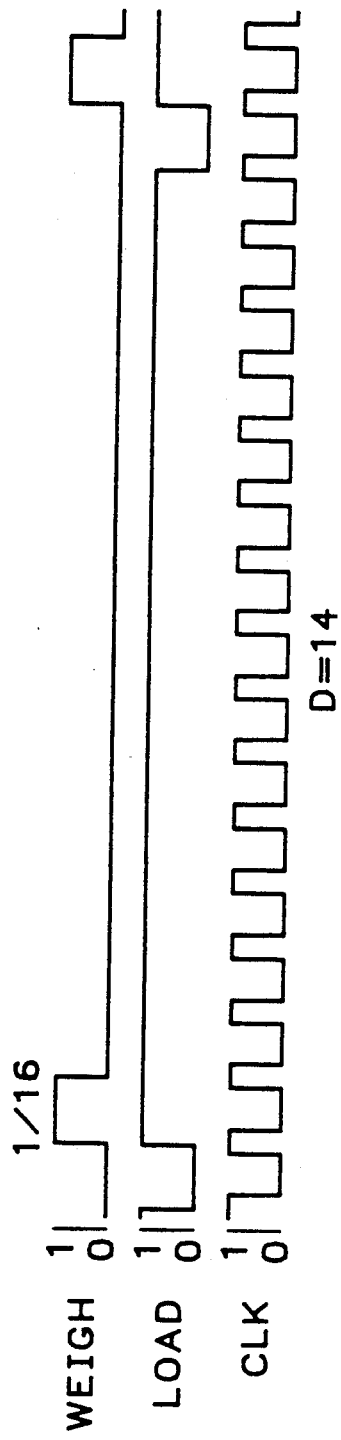
Figure 9:
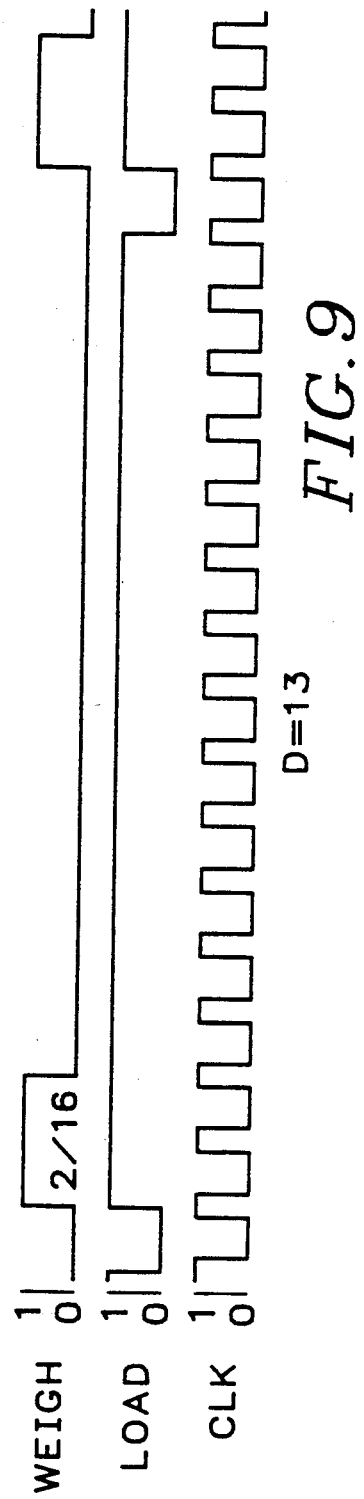

Weighting circuit 20 essentially counts clock pulses ($f_c$) and for a first predetermined number of clock pulses the WEIGH signal is normally down while for a second predetermined number of clock pulses the WEIGH signal is up. The proportion of the time during which the WEIGH output is up to provide a carry-in signal to adder 10 is determined by a control number "D" applied as an input to weighting circuit 20. (A control number can be selected, however, such that the WEIGH signal is never up. See FIG. 7)

The weighting circuit thus facilitates time proportional assertion of the two integer phase increment values of N and N+1. The first asserted integer value, N, is the truncated portion or whole number portion of the calculated phase increment, N', while the second integer value, N+1, is greater by one. The application of these two integer phase increment values for different periods of time simulate a fractional portion of the calculated phase increment value N' whereby a quite accurate phase increment can be achieved without having to employ a very large adder 10.

In the FIG. 2 circuit, the input D is proportionally related to the desired fractional phase accumulation value and controls the output which is set to one for a duration of the required assertion of N+1 and to zero for a duration of the required assertion of N. Of course, the sequence is repetitive in response to the continued occurrence of the clock ($f_c$). The integer phase increment N is, in this manner, modulated according to a duty cycle dictated by the control number D.

According to a second embodiment of the invention as illustrated in FIG. 3, the above-described function of modulating the integer phase increment is implemented by providing a second adder 22, the output of which is applied to the A input of adder 10. Adder 22 receives, respectively, the integer phase increment N and the WEIGH output of weighting circuit 20. In applications where digital FM is required, providing the second adder does not increase the circuit complexity since this adder is needed for implementing the FM function.

In the instance of either the circuit embodiment of FIG. 2 or the circuit embodiment of FIG. 3, it will be seen that the number of tunable frequencies is increased substantially over the number selectable by truncated integer phase increment N alone. The number of increased tunable frequencies is multiplied by the precision or resolution of weighting circuit 20 in which "k" is the number of bits in control number D. A number of additional channels, $2^k$, is added between the channels determined by adjacent values of N.

The following mathematical relationships are employed to describe the operation of the invention in greater detail. To arrive at the desired phase increment value, N', for a given output frequency, $f_o$, the frequency equation (1) is solved with N' substituted for N:

$$N' = f_o 2^n / f_c \quad (4)$$

where N' is a positive phase increment value.

In accordance with the present invention, N is set to the integer portion of N', and P' is assigned the fractional portion of N', such that N' is the weighted function of N and P':

$$N' = N(1 - P') + (N+1)P' \quad (5)$$

For the accurate setting of the direct digital synthesizer output frequency, $1 - P'$ is the proportional time during which the value N is to be asserted, and P' is the proportional time that $N+1$ is asserted. Considering proportional weighting circuit 20, due to the discrete nature thereof, the circuit can only accommodate integer values within the limits of its numeric resolution (k), or integer values between 0 and $2^k - 1$. Therefore, it is convenient to scale the real fraction, P', to an integer weighting factor P within this range:

$$P \leq P' 2^k \quad (6)$$

where k is an integer reflecting the resolution or size in bits of the weighting circuit. The last expression is an approximation since P is a rounded-off and truncated integer value. This integer value is used for setting the proportional weighting circuit and can assume values of $0, 1, \ldots, 2^k - 1$.

A modified expression for the real phase increment can be rewritten using the above scaling function, as:

$$N' = N(1 - P/2^k) + (N+1)P/2^k \quad (7)$$

For instance, for a particular implementation of the circuit, P equal to zero forces the phase increment to always be equal to N, and for P equal to $2^{k-1}$, N and $N+1$ are applied alternately for equal periods of time to provide a fifty percent duty cycle. $N' = N + P/2^k$ is an approximation of N' since its accuracy is limited by P, the accuracy of which is bound by $\pm \frac{1}{2}^{(k+1)}$.

The modified output frequency of a circuit according to the present invention is:

$$f_o = f_c(N + (P/2^k))/2^n \quad (8)$$

The frequency resolution of a direct digital synthesizer according to the present invention can be expressed as the derivative of the output frequency in respect to the variable P:

$$df_o/dP = d/dP(f_c(N + (P/2^k))/2^n)$$

$$df_o/dP = f_c/2^{(n+k)} \text{ (Hz/count)} \quad (9)$$

Compared to prior phase accumulators, the circuit according to the present invention exhibits $2^k$ times as many tuning channels. Further, the number of tuning channels, $n_f$, which is the total number of discrete tunable frequencies below the Nyquist frequency ($f_o < f_c/2$) is:

$$n_f = 2^{n+k-1} - 1 \quad (10)$$

It will be noted that the output (WEIGH) of the weighting circuit is periodic with an update rate related to the resolution (size) of the circuit, and to the clock rate, such that the update rate is no greater than $f_u$:

$$f_u = f_c/2^k \quad (11)$$

The proportional weighting circuit 20 is controlled to provide a programmable binary output signal proportional to P, such that this output is asserted to a high logic level for the duration of $P/2^k$, and to a low logic level for the rest of this period. Further, this circuit's output is controllable in fractional increments of $\frac{1}{2}^k$ of the update period, and provides $2^k$ distinct pulse widths or different duty cycles. For instance, for k=4, an output can be set to a high logic level for a range of 0/16 to 15/16 of the update period, or P equals 0 to 15. An example of a weighting circuit in accordance with the present invention is depicted in FIG. 4. For ease of illustration and explanation, a relatively small circuit with four bit resolution (k=4) is used, but it is understood that the resolution is arbitrary and larger circuits with higher resolution are quite practical, representing simple extensions of the circuit shown.

Referring to FIG. 4, a first four bit binary counter 24, which may comprise a type 74HC393, receives clock signal ($f_c$) via inverter 26 and counts the clock pulses. The four Q outputs of this binary counter are provided as inputs to NAND gate 28. The output of gate 28, designated LOAD, is applied to the parallel data load terminal of a second four bit binary counter 30, which may comprise a type 74HC161, that also receives the clock signal ($f_c$). The control number D is received at parallel data input terminals $D_{3-0}$ of the counter. The ripple carry output of the counter provides the WEIGH output of the weighting circuit as applied to adder 10 or adder 22, and is also connected to the P input of counter 30 for causing counter 30 to cease counting.

Considering operation of the FIG. 4 circuit, upon each positive going edge of the clock ($f_c$), the first counter 24 increments its count for changing its output state, counting up from 0 to 15 in a modulus 16 sequence (0, 1, 2 ... 14, 15, 0, 1 ... ). On reaching state 15, the first counter 24 provides all inputs to NAND gate 28 for asserting the synchronous parallel data load (LOAD) signal applied to counter 30 which accordingly loads the proportional weighting value (control number D) at the next occurrence of the positive going edge of the clock. The counter 30 then counts up from the asserted state D to its maximum count value of $2^k - 1 = 15$. Once counter 30 reaches this count, it asserts its carry bit (WEIGH) that is applied via inverter 32 for causing counter 30 to cease counting until the next LOAD signal occurs as described above. The circuit cycles through this sequence for causing the phase accumulator to alternately employ $N+1$ and N as the integer phase increment.

Referring to examples of timing diagrams as depicted in FIGS. 5 through 9, it will be noted that the indicated carry bit (WEIGH) of counter 30 is applied directly to the carry-in input of adder 10 in FIG. 2, or as the input of adder 22 in FIG. 3. In the present implementation, there is an inversion of the carry output line from counter 30 to achieve the P=0 value. Further, the relationship between P and D is such that for P=0, D=15, or D=15-P as indicated by the diagrams of FIGS. 5 through 9 and Table I following. The table indicates "duty cycle" or the proportion of the time during which the phase accumulator accumulates the integer phase increment N+1 as compared to the integer phase increment N.

TABLE I
(duty cycle table)

| D | Ratio |
|---|---|
| 0 | 15/16 |
| 1 | 14/16 |
| 2 | 13/16 |
| 3 | 12/16 |
| 4 | 11/16 |
| 5 | 10/16 |
| 6 | 9/16 |
| 7 | 8/16 |
| 8 | 7/16 |
| 9 | 6/16 |
| 10 | 5/16 |
| 11 | 4/16 |
| 12 | 3/16 |
| 13 | 2/16 |
| 14 | 1/16 |
| 15 | 0/16 |

D = 16 − (1 + P)

Figure 5:
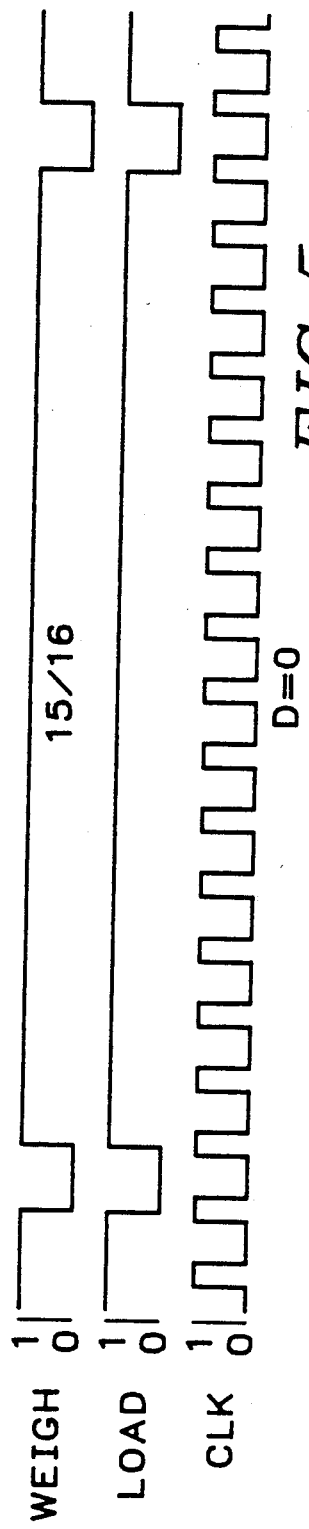
Figure 6:
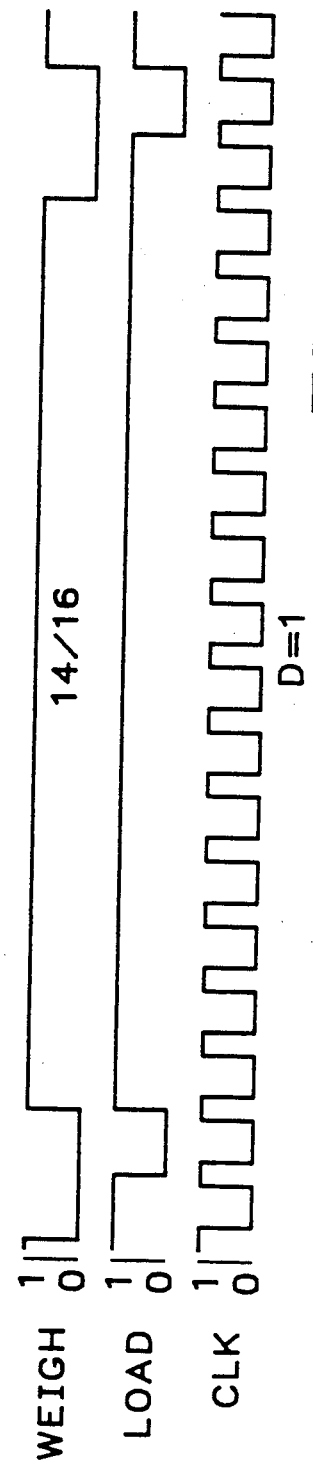

Referring to the timing diagram of FIG. 5, the condition is illustrated wherein the control number D equals zero, and the WEIGH (ratio) equals 15/16. Thus, a carry-in is provided to the adder 10 in the FIG. 2 circuit, or an additional one is added by the adder 22 to the FIG. 3 circuit, for 15/16 of the time, or for 15 out of 16 clock pulses. The ensuing timing diagrams of FIGS. 6 through 9 illustrate corresponding relationships when D equals 1, 15, 14 and 13, respectively.

In the example circuit illustrated, the advantage attained is the increase in the number of tuning channels by a factor of 16, as compared with using a prior art accumulator alone. In terms of added phase noise, due to the shifting of the phase increment back and forth, minimal indication is present as compared with the conventional direct digital synthesizer. For a 28-bit phase accumulator with a weighting circuit according to the present invention and a clock frequency of 10 Mhz, the maximum update rate of the weighting circuit, or the modulation rate, is $f_c/2^k = 625$ Khz. The FM deviation is $f_r = 0.037$ Hz. The highest level spurs at 0.037 Hz in respect to $f_o$ exhibit a level of about:

$$20 \log (2^{k-n-1})) = -150 \text{ dBc} \qquad (12)$$

The above figure is considered low for conventional direct digital synthesizer systems which generally exhibit low phase noise. Further, this noise falls very close to the carrier and is likely to be indistinguishable as compared with other phase noise contributions in a system.

In summary, the circuit according to the present invention adds resolution to a direct digital synthesizer without requiring a larger and slower phase accumulator. Thus, significantly more tuning channels are provided, which means more accuracy in frequency setting of the synthesizer. The circuit provides sufficiently accurate frequency output such that it can be considered coherent for many synthesis applications since, depending upon the clock frequency employed, the circuit could take several minutes or hours to become significantly out of phase in relation to a frequency reference.

While plural embodiments of the present invention have been shown and described, it will be apparent to those skilled in the art that many other changes and modifications may be made without departing from the invention in its broader aspects. The appended claims are therefore intended to cover all such changes and modifications as fall within the true spirit and scope of the invention.

I claim:

1. A direct digital synthesizer for producing a cyclic output, comprising:
   wave lookup means,
   means for addressing said wave lookup means in response to a phase increment value such that the address is changed by the increment value, and
   means coupled to said addressing means for alternately asserting a first said increment value for a first time period and a second said increment value for a second time period to provide an effective increment value therebetween in proportion to the times the first and second increment values are asserted.

2. A method for producing a cyclic output from wave lookup values stored in memory, comprising:
   accessing said lookup values with successively incremented addresses adapted to access successive amplitude points on a waveform stored in memory, including alternating the incrementation of said addresses with integer additions alternately above and below a desired exact increment value on a duty cycle basis.

3. A direct digital synthesizer for providing a cyclic output, comprising:
   wave lookup means,
   a phase accumulator employed to address said wave lookup means with a phase number, said phase accumulator receiving a phase increment value which is successively added to the value of said phase number,
   including means coupled to said accumulator for periodically increasing said phase increment value on a duty cycle basis to simulate a desired fractional part of said phase increment value, and
   digital-to-analog converter means for converting outputs accessed from said wave lookup means to provide a cyclic analog waveform.

4. A direct digital synthesizer for providing a cyclic output, comprising:
   wave lookup means for representing at least a portion of a waveform,
   phase accumulator means disposed in addressing relation to said wave lookup means for successively accessing values from said wave lookup means over said portion of said waveform, wherein a phase increment value is successively added to a total in said phase accumulator means to provide successive addresses for said wave lookup means, and means coupled to said phrase accumulator means for changing said phase increment value on a periodic basis over said portion of said waveform.

5. The direct digital synthesizer according to claim 4 wherein said means for changing said phase increment value on a periodic basis successively adds a one and a zero to said increment value over a predetermined duty cycle during said waveform portion, said duty cycle having a proportional relationship to a desired fractional part of the increment value.

6. A direct digital synthesizer for providing a cyclic output, comprising:
   phase accumulator means for successively accessing waveform data in response to a phase increment number wherein said phase increment number is successively added to an accumulated value, and
   weighting circuit means coupled to said phase accumulator means for interpolatively changing the frequency of said cyclic output by modifying the addition performed by said phase accumulator means in accordance with a phase adjustment.

7. The direct digital synthesizer according to claim 6 wherein said phase adjustment is added periodically on a duty cycle basis representing a fractional change in said phase increment number.

8. The direct digital synthesizer according to claim 7 wherein said phase accumulator means comprises an accumulating adder register by means of which the first increment number is successively added to a previous total to provide a new total.

9. The direct digital synthesizer according to claim 8 wherein said weighting circuit comprises:
   a first clock pulse counter for providing an output on a periodic basis when a given count is reached,
   a second pulse counter responsive to the first counter for receiving a data input representative of a desired phase adjustment and counting to overflow, and
   means for changing said increment number by a nonfractional value during the period when said second pulse counter is counting to overflow.

10. The direct digital synthesizer according to claim 8 wherein said accumulating adder register is provided with a carry-in input for receiving an integer phase adjustment.

11. The direct digital synthesizer according to claim 8 wherein an additional adder is provided for receiving said phase increment number and an integer phase adjustment for providing the sum as an input for said accumulating adder register.

* * * * *